(12) United States Patent
Ah

(10) Patent No.: US 10,030,836 B2
(45) Date of Patent: Jul. 24, 2018

(54) LIGHTING APPARATUS FOR AUTOMOBILE

(71) Applicant: HYUNDAI MOBIS Co., Ltd., Yongin-si, Gyeonggi-do (KR)

(72) Inventor: Sang Min Ah, Yongin-si (KR)

(73) Assignee: HYUNDAI MOBIS Co., Ltd., Yongin-si (KR)

( * ) Notice: Subject to any disclaimer, the term of this patent is extended or adjusted under 35 U.S.C. 154(b) by 51 days.

(21) Appl. No.: 15/052,059

(22) Filed: Feb. 24, 2016

(65) Prior Publication Data

US 2016/0245472 A1 Aug. 25, 2016

(30) Foreign Application Priority Data

Feb. 25, 2015 (KR) .......................... 10-2015-0026254

(51) Int. Cl.
| | | |
|---|---|---|
| *F21S 43/237* | (2018.01) | |
| *F21S 8/10* | (2006.01) | |
| *F21V 8/00* | (2006.01) | |
| *F21S 43/14* | (2018.01) | |
| *F21S 43/27* | (2018.01) | |
| *F21S 43/245* | (2018.01) | |
| *F21S 43/247* | (2018.01) | |

(52) U.S. Cl.
CPC ........... *F21S 48/2206* (2013.01); *F21S 43/14* (2018.01); *F21S 43/237* (2018.01); *F21S 43/245* (2018.01); *F21S 43/247* (2018.01); *F21S 43/27* (2018.01); *G02B 6/0006* (2013.01)

(58) Field of Classification Search
CPC .. F21S 48/2206; F21S 48/215; F21S 48/2237; F21S 48/2268; F21S 48/2287; F21S 48/2225; F21S 48/225; F21S 48/2262; F21S 48/2293; F21S 48/1208; F21S 48/33; G02B 6/0006; G02B 6/0008; G02B 6/0023
See application file for complete search history.

(56) References Cited

U.S. PATENT DOCUMENTS

| | | | | |
|---|---|---|---|---|
| 5,993,036 | A * | 11/1999 | Shimada ............... | B60Q 1/0466 362/267 |
| 6,299,334 | B1 * | 10/2001 | Schwanz ............. | F21S 48/2237 362/494 |
| 2004/0136203 | A1 * | 7/2004 | Gasquet .............. | F21S 48/2268 362/543 |
| 2005/0270794 | A1 * | 12/2005 | Okamoto ............ | F21S 48/2287 362/555 |
| 2006/0147151 | A1 * | 7/2006 | Wanninger ............. | G02B 6/003 385/31 |
| 2006/0275000 | A1 * | 12/2006 | Yuang .................. | G02B 6/4204 385/92 |

* cited by examiner

*Primary Examiner* — Y M. Lee
(74) *Attorney, Agent, or Firm* — Paratus Law Group, PLLC

(57) ABSTRACT

Provided is a lighting apparatus for an automobile which improves luminous efficiency. To this end, the lighting apparatus for an automobile according to the exemplary embodiment of the present invention includes: a board on which a light source for generating light is mounted; and a light guide which has one end coupled to the board, and a light source insertion portion which protrudes at the one end, in which a protruding tip of the light source insertion portion is in contact with a surface of the board where the light source is mounted.

6 Claims, 4 Drawing Sheets

LIGHTING APPARATUS FOR AUTOMOBILE

CROSS-REFERENCE TO RELATED APPLICATIONS

The present application claims priority to Korean Patent Application Number 10-2015-0026254 filed Feb. 25, 2015, the entire contents of which the application is incorporated herein for all purposes by this reference.

TECHNICAL FIELD

The present invention relates to a lighting apparatus for an automobile, and more particularly, to a lighting apparatus for an automobile, in which a light guide through which light generated by a light source is emitted and passed is installed.

BACKGROUND

In general, various types of lighting apparatuses are mounted in an automobile to provide automobile safety and convenience in driving the automobile, and as the lighting apparatuses, there are head lamps, tail lamps, direction indicating lamps, and the like.

Recently, in accordance with a tendency to consider design of the automobile to be important, a lighting apparatus, which has a light guide with patterns formed therein which allows the entirety or a part of light from a light source to be reflected and emitted while passing through the light guide so that the light source for generating light is not directly exposed and an indirect lighting effect may be exhibited, is being developed.

However, because the light source and the light guide are disposed to be spaced apart from each other, an air layer is present between the light source and the light guide, and a loss of light occurs when the light generated by the light source passes through the air layer, and as a result, there is a problem in that luminous efficiency deteriorates.

SUMMARY

The present invention has been made in an effort to provide a lighting apparatus for an automobile which improves luminous efficiency.

Technical problems of the present invention are not limited to the aforementioned technical problem, and other technical problems, which are not mentioned above, may be clearly understood by those skilled in the art from the following descriptions.

An exemplary embodiment of the present invention provides a lighting apparatus for an automobile, including: a board on which a light source for generating light is mounted; and a light guide which has one end coupled to the board, and a light source insertion portion which protrudes at the one end and into which the light source is inserted, and allows light generated by the light source to be emitted while passing through the light guide, and allows light generated by the light source to be emitted while passing through the light guide, in which a protruding tip of the light source insertion portion is in contact with a surface of the board where the light source is mounted.

Other detailed matters of the exemplary embodiment are included in the detailed description and the drawings.

In the lighting apparatus for an automobile according to the present invention, since the light source insertion portion into which the light source is inserted protrudes at one end of the light guide, and the protruding tip of the light source insertion portion is in contact with the surface of the board where the light source is mounted, it is possible to prevent air from flowing into the light source insertion portion, thereby improving luminous efficiency.

The effects of the present invention are not limited to the aforementioned effects, and other effects, which are not mentioned above, will be clearly understood by those skilled in the art from the claims.

DETAILED DESCRIPTION

Figure 1:
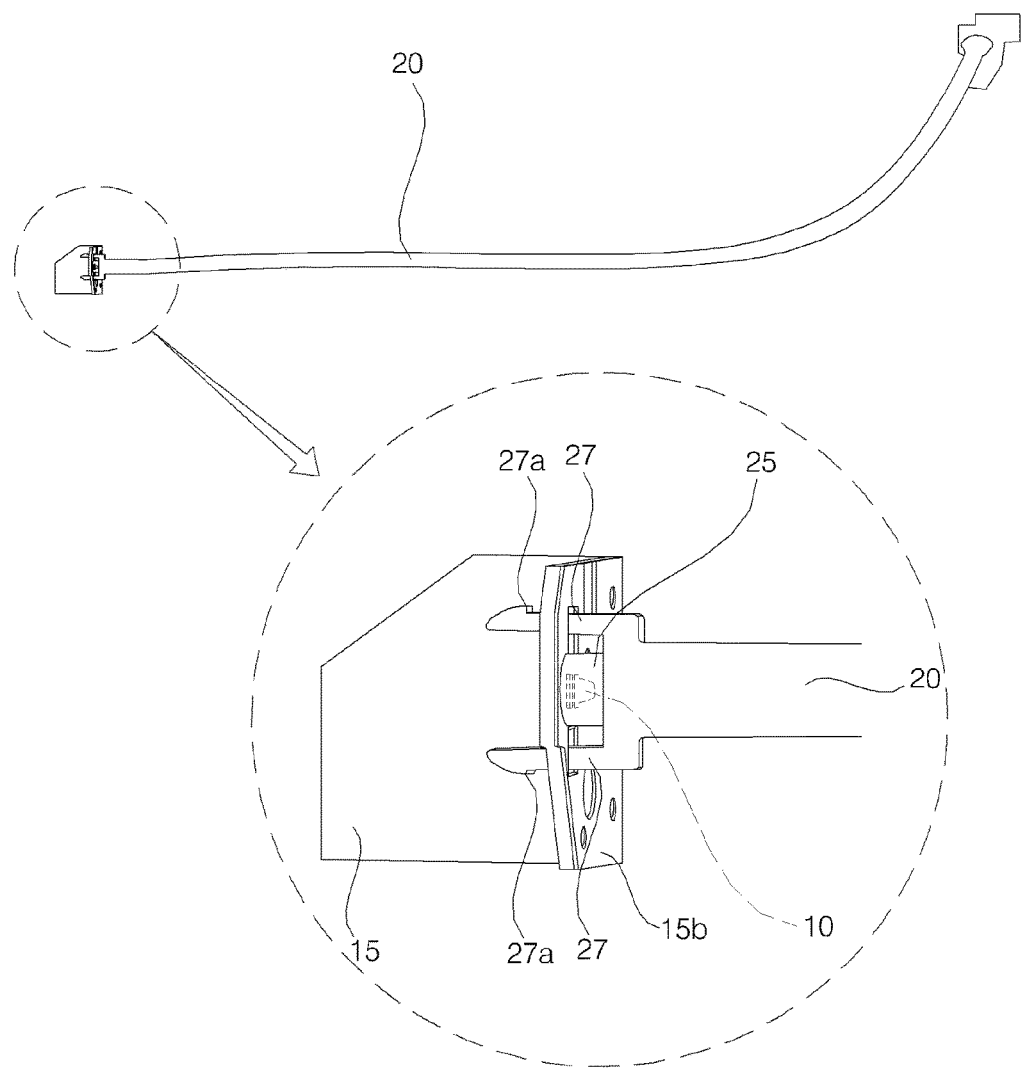
FIG. 1 is a perspective view illustrating a lighting apparatus for an automobile according to an exemplary embodiment of the present invention.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a lighting apparatus for an automobile according to an exemplary embodiment of the present invention will be described with reference to the drawings.

Figure 2:
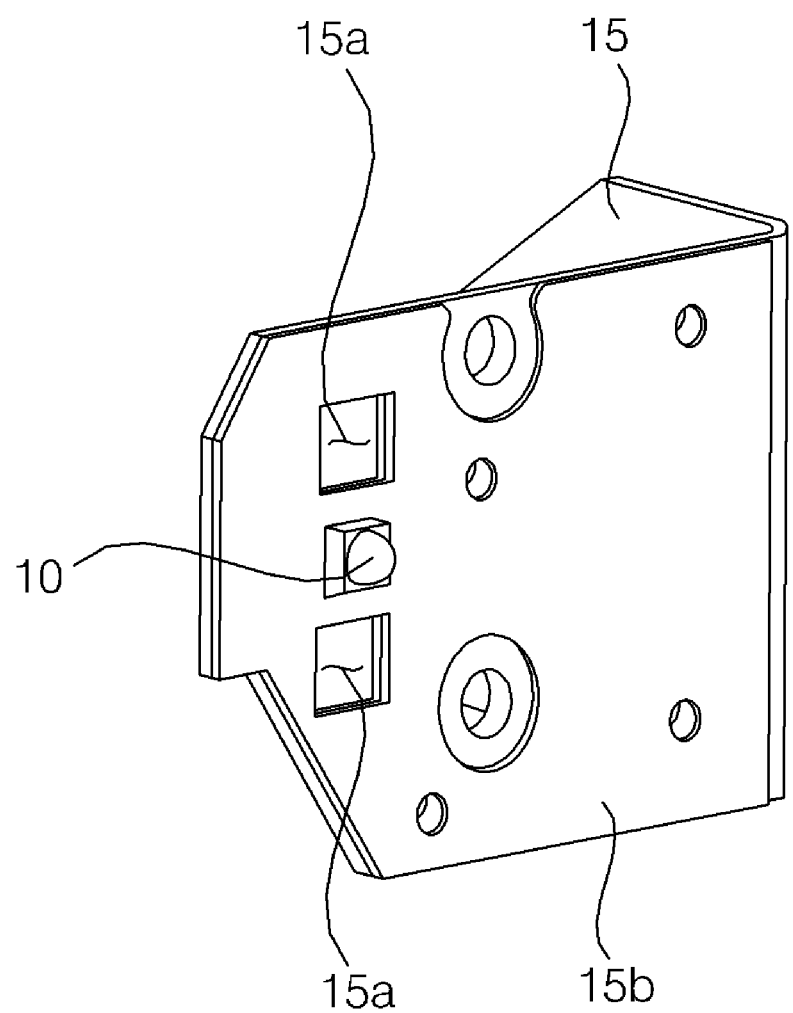
FIG. 2 is a view illustrating a board illustrated in FIG. 1.
Figure 3:
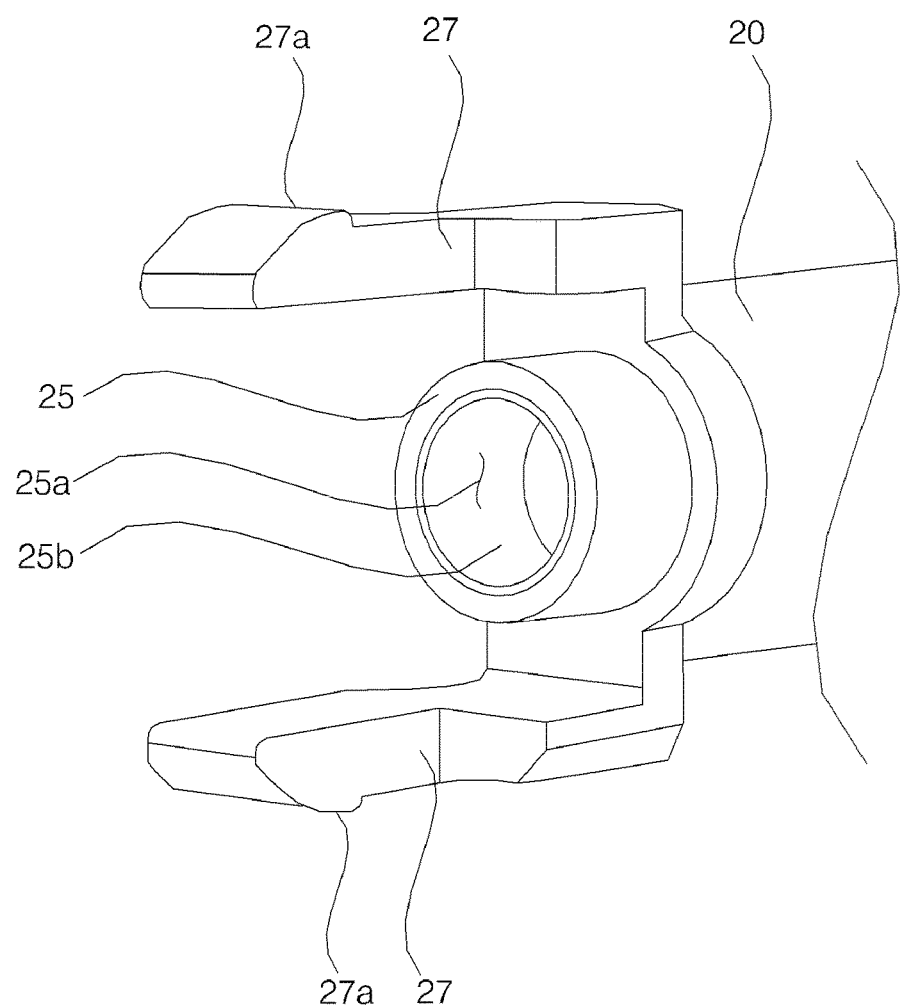
FIG. 3 is a view illustrating a light guide illustrated in FIG. 1.
Figure 4:
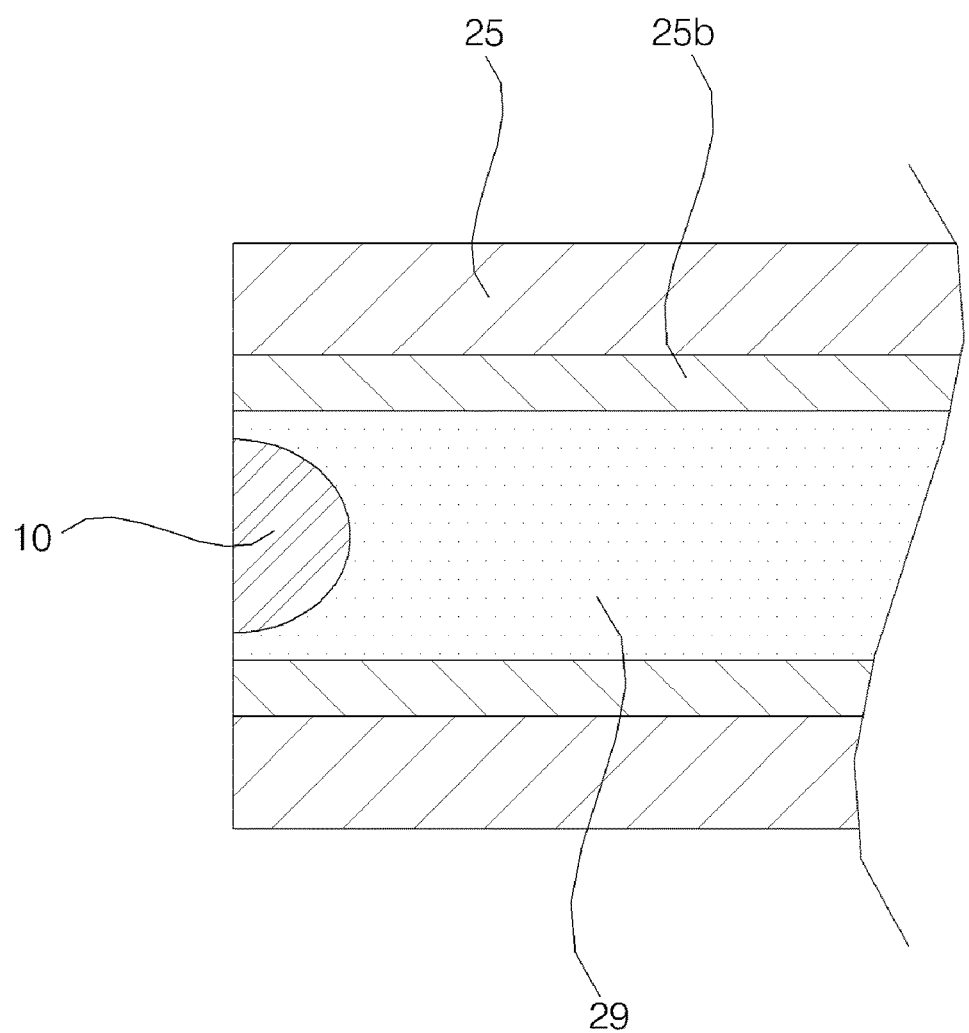
FIG. 4 is a cross-sectional view illustrating a state in which a light source is inserted into and coupled to a light source insertion portion formed in the light guide.

FIG. 1 is a perspective view illustrating a lighting apparatus for an automobile according to an exemplary embodiment of the present invention, FIG. 2 is a view illustrating a board illustrated in FIG. 1, FIG. 3 is a view illustrating a light guide illustrated in FIG. 1, and FIG. 4 is a cross-sectional view illustrating a state in which a light source is inserted into and coupled to a light source insertion portion formed in the light guide.

Referring to FIGS. 1 to 4, a lighting apparatus for an automobile according to an exemplary embodiment of the present invention includes a light source 10 which generates light, and a light guide 20 from which the light generated by the light source 10 is emitted while passing through the light guide 20.

The light source 10 includes a light emitting diode (LED), and a cover which is made of silicone and surrounds and seals the LED, and the light source 10 is mounted on a board 15. The board 15 may be a typical printed circuit board (PCB) or a flexible printed circuit board (FPCB).

The light guide 20 is made of a flexible material, and elongated by a predetermined length. One end of the light guide 20 in a longitudinal direction is coupled to the board 15, and the other end of the light guide 20 is coupled to an automotive body. In the present exemplary embodiment, the light guide 20 is formed to have a circular cross section, but the shape of the light guide 20 is not limited thereto, and the light guide 20 may be formed in a plate shape.

Patterns (not illustrated), which reflect the entirety or a part of light entering the light guide 20 and emit the light to the outside of the light guide 20, are formed in the light guide so that the light generated by the light source 10 may be emitted from the light guide 20 while passing through the light guide 20. That is, the light guide 20 allows the light generated by the light source 10 to be guided and emitted by the patterns from one end to the other end thereof.

A light source insertion portion 25 into which the light source 10 is inserted protrudes at one end of the light guide 20 in the longitudinal direction. The light source insertion portion 25 protrudes in a circular shape at one end of the light guide 20. A circular insertion groove 25a into which the light source 10 is inserted is formed in the light source insertion portion 25, such that the light source 10 may be inserted into the insertion groove 25a and disposed in the light source insertion portion 25. The shapes of the light source insertion portion 25 and the insertion groove 25a may be changed to various shapes corresponding to the shape of the light source 10.

However, if an air layer is present between the light source 10 and the light guide 20, a loss of light occurs when the entirety or a part of the light generated by the light source 10 is reflected while passing through the air layer, and the number of media through which the light passes is increased compared to a case in which no air layer is present, and as a result, transmittance of light entering the light guide 20 from the light source 10 also deteriorates, and luminous efficiency deteriorates.

Therefore, to prevent an air layer from being present between the light source 10 and the light guide 20, a protruding tip of the light source insertion portion 25 is in contact with a surface of the board 15 where the light source 10 is mounted, thereby preventing air from flowing into the insertion groove 25a formed in the light source insertion portion 25.

In addition, the insertion groove 25a is filled with a sealing member 29. The sealing member 29 seals a portion between the light source 10 and the light source insertion portion 25, thereby allowing the light emitted from the light source 10 to enter the light guide 20 without passing through an air layer. Since the sealing member 29 is present between the light source 10 and the light guide 20 instead of an air layer, the sealing member 29 may be made of a material that has a higher refractive index than air. In the present exemplary embodiment, an ultraviolet (UV) silicone is used as the sealing member 29.

The UV silicone has a higher refractive index than air, and also has higher thermal conductivity than air. In the present exemplary embodiment, assuming that air is a reference medium (refractive index=1), the LED having a refractive index of about 3 is used as the light source 10, and the UV silicone having a refractive index of about 1.5 is used as the sealing member 29.

Because a refractive index of air is 1, in the related art in which the light source 10 is disposed outside the light guide 20 instead of being inserted into the light source insertion portion 25 and disposed in the light guide 20, a difference in refractive index between the light source 10 and air is 2 which is a value produced by subtracting the refractive index 1 of air from the refractive index 3 of the light source 10. In this case, a critical angle for total reflection of the light, which is emitted from the light source 10 into the air, is about 33.9 degrees.

In contrast, a difference in refractive index between the light source 10 and the sealing member 29 according to the present exemplary embodiment is 1.5 which is a value produced by subtracting the refractive index 1.5 of the sealing member 29 from the refractive index 3 of the light source 10, this difference in refractive index is smaller than that in the related art, and a critical angle for total reflection is about 52.4 that is larger than that in the related art, such that luminous efficiency is improved.

An inner surface of the light source insertion portion 25 is processed by plasma 25b. The plasma 25b allows the sealing member 29 to be in close contact with the inner surface of the light source insertion portion 25.

One end of the light guide 20 where the light source insertion portion 25 is formed is coupled to the board 15. To allow one end of the light guide 20 to be coupled to the board 15, coupling holes 15a are formed in the board 15, and coupling protrusions 27, which are inserted into the coupling holes 15a and coupled to the board 15, are formed at one end of the light guide 20. In the present exemplary embodiment, two coupling holes 15a and two coupling protrusions 27 are formed. The light source 10 is disposed between the two coupling holes 15a, and the light source insertion portion 25 is disposed between the two coupling protrusions 27.

A hook 27a is formed at a tip of the coupling protrusion 27. In a state in which the coupling protrusion 27 is inserted into the coupling hole 15a, the hook 27a is caught by a rear surface of the board 15 which is opposite to the surface of the board 15 on which the light source 10 is mounted, thereby preventing the coupling protrusion 27 from being withdrawn from the board 15.

The coupling protrusions 27 protrude by a predetermined length from one end of the light guide 20 so that the hooks 27a may be elastically caught by the rear surface of the board 15, and the coupling protrusions 27 are inserted into the coupling holes 15a while being narrowed inward, and spread outward again after being completely inserted into the coupling holes 15a, thereby allowing the hooks 27a to be caught by the rear surface of the board 15.

The coupling protrusion 27 protrudes to be longer than the light source insertion portion 25, such that in a state in which the coupling protrusion 27 is coupled to the board 15, the protruding tip of the light source insertion portion 25 may be in contact with the surface of the board 15 where the light source 10 is mounted.

The surface of the board 15 where the light source 10 is mounted is processed by plasma 15b. Therefore, in a state in which the coupling protrusion 27 is coupled to the board 15, the tip of the light source insertion portion 25 is in close contact with the plasma 15b.

A process of assembling the lighting apparatus for an automobile according to the exemplary embodiment of the present invention, which is configured as described above, will be described below. However, in completing the lighting apparatus for an automobile according to the exemplary embodiment of the present invention as illustrated in FIG. 1, the sequence of the assembly process may not necessarily be coincident with the sequence to be described below.

First, the inner surface of the light source insertion portion 25 formed on the light guide 20 is processed by the plasma 25b.

Thereafter, the insertion groove 25a formed in the light source insertion portion 25 is filled with the UV silicone in a soft state. The UV silicone is hardened to become the sealing member 29.

Thereafter, the surface of the board 15 where the light source 10 is disposed is processed by the plasma 15b.

Thereafter, the coupling protrusions 27 are inserted into the coupling holes 15a while the light source 10 is inserted into the insertion groove 25a filled with the UV silicone, and as a result, the light guide 20 is assembled to the board 15, and the assembly process is completed. In this state, the light source 10 is inserted into the light source insertion portion 25, a portion between the light source 10 and the light source insertion portion 25 is sealed by the sealing member 29, and then the UV silicone is hardened to become the sealing member 29, such that the lighting apparatus as illustrated in FIG. 1 is completely assembled.

As described above, in the lighting apparatus for an automobile according to the present invention, since the light source insertion portion 25 into which the light source 10 is inserted protrudes at one end of the light guide 20, and the protruding tip of the light source insertion portion 25 is in contact with the surface of the board 15 where the light source 10 is mounted, it is possible to prevent air from flowing into the light source insertion portion 25, thereby improving luminous efficiency.

It may be understood by a person skilled in the art that the present invention may be carried out in other specific forms without changing the technical spirit or the essential characteristics of the present invention. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A lighting apparatus for an automobile, comprising:
   a board including a first surface on which a light source for generating light is mounted; and
   a light guide which has one end coupled to the board, and a light source insertion portion which protrudes at the one end and into which the light source is inserted, and allows light generated by the light source to be emitted while passing through the light guide,
   wherein a protruding tip of the light source insertion portion protruded from the light guide is in contact with the first surface of the board where the light source is mounted,
   wherein the light source insertion portion includes:
      an insertion groove formed in the light source insertion portion and into which the light source is inserted;
      a sealing member made of ultraviolet silicone with which the insertion groove is filled and which seals a gap between the light source insertion portion and the light source; and
      a first plasma layer formed, on an inner surface of the light source insertion portion, by plasma processed on the inner surface of the light source insertion portion, and
   wherein the first surface of the board includes a second plasma layer formed by plasma processed on the first surface of the board, on which the light source is mounted.

2. The lighting apparatus of claim 1, wherein a coupling hole is formed in the board, and a coupling protrusion, which is inserted into and coupled to the coupling hole, is formed at the one end of the light guide.

3. The lighting apparatus of claim 2, wherein a hook, which is caught by a second surface of the board which is opposite to the first surface of the board where the light source is mounted, is formed at a tip of the coupling protrusion.

4. The lighting apparatus of claim 2, wherein the number of coupling holes and the number of coupling protrusions are two or more, respectively.

5. The lighting apparatus of claim 4, wherein the light source is disposed between the plurality of coupling holes, and the light source insertion portion is disposed between the plurality of coupling protrusions.

6. The lighting apparatus of claim 1, wherein the light guide is made of a flexible material.

\* \* \* \* \*